United States Patent [19]

McGrew et al.

[11] 4,247,281
[45] Jan. 27, 1981

[54] SLASH BURNING

[75] Inventors: Norman E. McGrew, Dayton; Ralph S. Grow, Newberg, both of Oreg.

[73] Assignee: Western Helicopter Services, Inc., Newberg, Oreg.

[21] Appl. No.: 46,235

[22] Filed: Jun. 7, 1979

[51] Int. Cl.³ .................... A01M 15/00; A01M 21/04
[52] U.S. Cl. .......................................... 431/91; 244/3; 244/12.11; 244/118.1
[58] Field of Search .............. 431/2, 91; 244/3, 17.11, 244/118.1

[56] References Cited
U.S. PATENT DOCUMENTS

| | | | |
|---|---|---|---|
| 2,331,388 | 10/1943 | Graham | 431/91 |
| 3,030,050 | 4/1962 | Hogemann | 244/3 |
| 3,872,769 | 3/1975 | Rosling | 431/91 |
| 3,904,156 | 9/1975 | Smith | 244/118.1 |

Primary Examiner—George E. Lowrance
Attorney, Agent, or Firm—Klarquist, Sparkman, Campbell, Leigh, Hall and Whinston

[57] ABSTRACT

The specification discloses a dispenser carried by a helicopter for dispensing a jelly-like mixture of aluma gel and gasoline. The dispenser has a frame carrying a barrel containing the mixture. A pump on the frame pumps the mixture through a nozzle from which the mixture drops and igniting electrodes ignite the jelly-like mixture which contracts into a flaming ball and drops on slash to be burned.

6 Claims, 4 Drawing Figures

U.S. Patent    Jan. 27, 1981    4,247,281
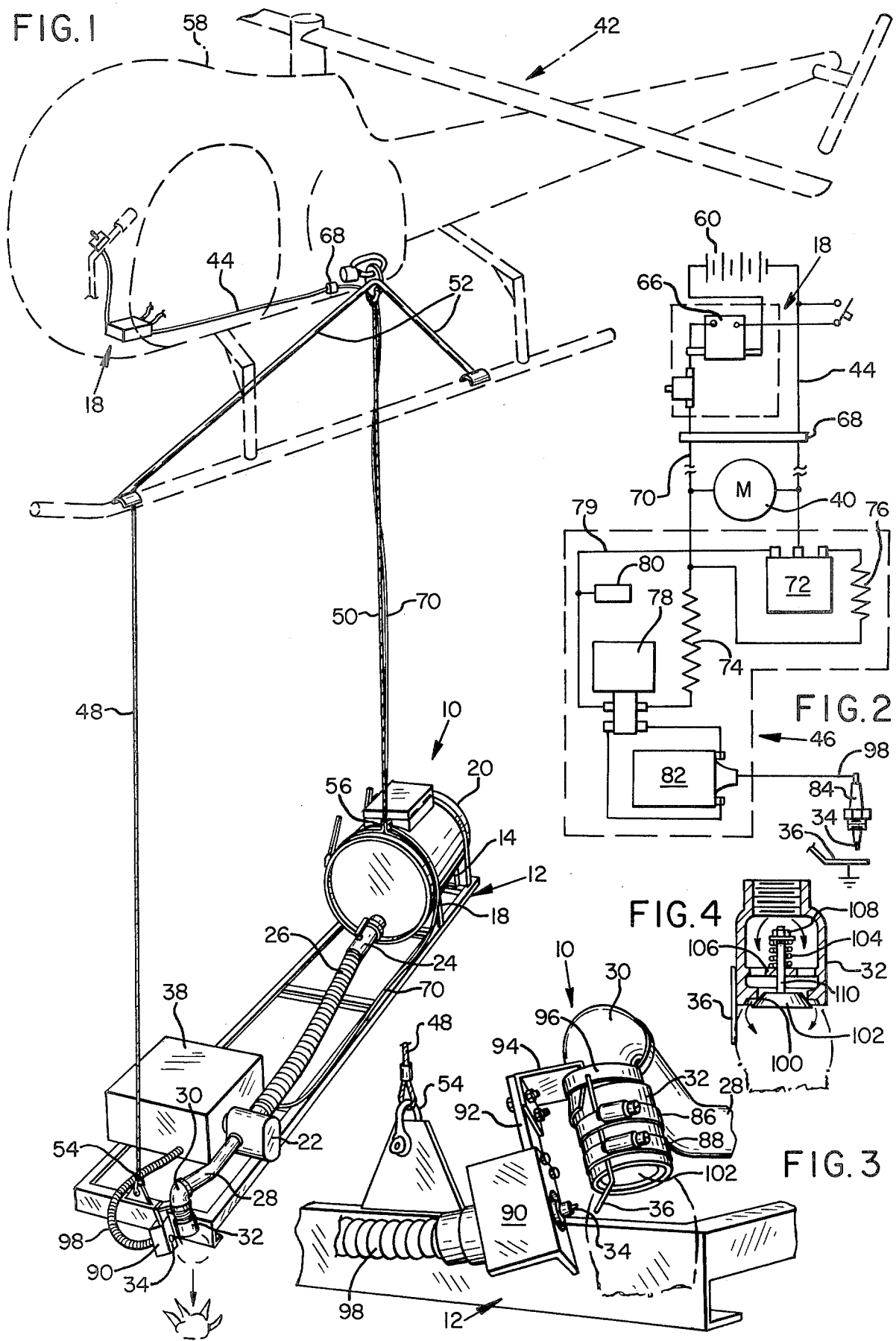

4,247,281

SLASH BURNING

DESCRIPTION

This invention relates to slash burning, and has for an object thereof the provision of improved slash burning.

Another object of the invention is to provide a method and an apparatus for quickly and safely burning slash.

A further object of the invention is to provide a dispenser carried by a helicopter for extruding, forming into a flaming ball, igniting and dropping a jelly-like mixture of aluma gel and gasoline.

Another object of the invention is to provide a method of slash burning in which a mixture of aluma gel and gasoline is extruded, ignited, formed into a ball, and dropped onto material to be burned.

IN THE DRAWINGS

FIG. 1 is a perspective view of a helicopter and a dispenser forming one embodiment of the invention;

FIG. 2 is a schematic view of an ignition circuit of the dispenser of FIG. 1;

FIG. 3 is an enlarged, fragmentary, perspective view of a portion of the dispenser of FIG. 1; and, FIG. 4 is an enlarged, longitudinal, sectional view of a nozzle of the dispenser of FIG. 1.

A dispenser 10 forming one specific embodiment of the invention includes a ladder-like base 12 having a saddle 14 to which a barrel 16 is releasably secured by straps 18 and 20. A positive displacement pump 22 pumps a highly inflammable mixture of a viscosity about that of a thin jelly from the barrel through a shutoff valve 24, a hose 26, a short, upwardly inclined pipe 28, an elbow 30 and a nozzle 32. The jelly-like mixture is extruded continuously, is ignited and contracts into a flaming ball. The mixture is ignited, as it comes out in stream form, by electrodes 34 and 36. The electrodes are positioned to cause the spark to go through the stream. A box 38 covers an electric motor 40 driving the pump and driven by power supplied by a helicopter 42 through an electrical cable 44 and a circuit 46 in a control box covered by the box 38. Cables 48 and 50 from a cable hanger 52 are hooked to an eye 54 attached to the front end of the base 12 and an eye 56 attached to the strap 18. The cable hanger is releasably attached to the helicopter by a known manual control in cab 58. The nozzle is pointed substantially directly downwardly and is spaced sufficiently from the base 12 so as to avoid overheating the base.

In FIG. 2 there is shown the circuit 46, which includes a battery 60 of the helicopter cab 58 and a switch 62 positioned in the helicopter conveniently to the pilot. A connector box 64 fixed to the top of the barrel 16 has one socket 66 to which the cable 18 is releasably connected by a plug and second socket 68 to which is releasably connected a cable 70 leading to the pump motor 40 and the ignition circuit 46 in the box 38. The wires of the cable 70 lead to a conventional vibrator 72 and resistors 74 and 76. The output of the vibrator 72 is fed through a capacitive discharge ignitor 78 and a capacitor 80 to a coil 82 whose output is connected to the electrode 34. The electrode 34 is the center electrode of a spark plug 84, which is a conventional automobile spark plug except for removal of the usual grounding electrode. The electrode 36 is spaced about one-half inch from the electrode, secured by clamps 86 and 88 to the nozzle 34, and these two electrodes are so positioned that the spark goes through the jelly gas to ignite it. The electrode 34 is carried by a mounting bracket 90 carried by plate 92 bolted to a U-shaped bracket 94 clamped to the elbow 30 by a clamp 96. A cable 98 leaving the box 38 connects the coil 84 to the electrode 34.

The nozzle 32 has an orifice 100 (FIG. 4) normally closed by a valve head 102 urged toward a closed position by a spring 104 pressing against a spider 106 and a spring seat 108 on rod 110 carrying the valve head. The check valve thus formed serves, when the pump 22 is not running, to close the nozzle and to permit flow through the nozzle when the pump is operating.

The jelly-like mixture may be about one pound of Aluma Gel supplied by Whitco Chemical Co., to five gallons of gasoline. The mixture, preferably, is of a viscosity such that, when dispensed through the nozzle at seventeen-and-one half gallons per minute and ignited, it forms balls or tear drops of about one quart volume for each ball about ten feet from the nozzle. The aluma gel is not explosive and can be stored safely. A preferred velocity of the helicopter is about forty-five to fifty miles per hour while dispensing the mixture at about seventeen-and-one-half gallons per minute, which drops one flaming ball of about one-quart in volume every four to five feet, if conditions are ideal. The flaming balls splatter as they hit the piles of slash or brush on the ground, the smaller balls of the splatter all flaming, and continue to burn to ignite the slash and/or brush. The balls also drop, flaming, through the upper portions of slash piles to ignite the lower portions of the piles, which, of course, helps burn the piles rapidly.

One quart of the mixture will burn about five minutes. The helicopter can be flown in any desired pattern to burn an area, one excellent method being to fly back and forth in an exaggerated zig-zag line of flight. The height of the helicopter above the ground can be from forty to one-hundred feet or even higher during the dispensing so that its operation is very safe. Also, the whole dispenser can be instantly jettisoned by the pilot if the need should ever arise.

The unit 10 also can be used to dispense a marking fluid, which might be latex paint, for example.

It will be noted that the base 12, suspended under one of the runners of the helicopter and the nozzle, is at the outboard side of the base and at its forward end. This position makes the nozzle and its operation visible to the pilot.

What is claimed is:
1. In an apparatus for burning slash,
   a base adapted to be slung under and carried by a helicopter,
   a reservoir of an inflammable fuel mixture mounted on the base,
   a downwardly directed extruding nozzle means mounted on the base,
   pump means mounted on the base for continuously forcing the fuel mixture through the nozzle means to form it into a stream,
   and ignition means for continuously igniting the stream which contracts into flaming balls as it drops.
2. The apparatus of claim 1 wherein the base is sled-like.
3. The apparatus of claim 1 wherein the ignition means comprises a pair of electrodes bracketing the stream between the electrodes.

4. The apparatus of claim 1 wherein the reservoir comprises a drum, and guide-connect means for releasably securing the drum to the base.

5. The apparatus of claim 1 wherein the pump means includes a positive displacement pump, an electric motor, and electrical conductor means to the motor adapted to be connected to a source of electrical power of the helicopter.

6. The apparatus of claim 1 wherein the nozzle means includes a nozzle and spring-biased valve means serving to normally close the valve to prevent flow of the mixture through the nozzle and openable when the pump means is operated to increase pressure on the mixture.

* * * * *